(12) United States Patent
Park et al.

(10) Patent No.: US 11,952,040 B2
(45) Date of Patent: Apr. 9, 2024

(54) VEHICLE BODY STRUCTURE FOR AN ELECTRIC VEHICLE

(71) Applicants: Hyundai Motor Company, Seoul (KR); Kia Corporation, Seoul (KR)

(72) Inventors: Jiwoong Park, Hwaseong-si (KR); Byeongcheon Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/736,299

(22) Filed: May 4, 2022

(65) Prior Publication Data

US 2023/0044592 A1 Feb. 9, 2023

(30) Foreign Application Priority Data

Jul. 20, 2021 (KR) .......................... 10-2021-0094859

(51) Int. Cl.
| | |
|---|---|
| *B62D 21/15* | (2006.01) |
| *B60L 53/16* | (2019.01) |
| *B62D 25/02* | (2006.01) |
| *B62D 25/04* | (2006.01) |
| *B62D 25/18* | (2006.01) |

(52) U.S. Cl.
CPC ............ *B62D 21/152* (2013.01); *B60L 53/16* (2019.02); *B62D 25/025* (2013.01); *B62D 25/04* (2013.01); *B62D 25/18* (2013.01)

(58) Field of Classification Search
CPC ..... B60D 21/152; B60L 53/16; B62D 25/025; B62D 25/04; B62D 25/18
See application file for complete search history.

(56) References Cited

U.S. PATENT DOCUMENTS

| | | | |
|---|---|---|---|
| 10,967,910 B2 * | 4/2021 | Kim ...................... | B62D 21/152 |
| 11,260,913 B2 * | 3/2022 | Hong .................... | B62D 25/081 |
| 2020/0317272 A1 * | 10/2020 | Hong ..................... | B62D 25/04 |
| 2022/0055693 A1 * | 2/2022 | Ryuno .................... | B60L 53/18 |

* cited by examiner

*Primary Examiner* — Jason D Shanske
*Assistant Examiner* — Matthew James O'Neill
(74) *Attorney, Agent, or Firm* — SLATER MATSIL, LLP

(57) ABSTRACT

An embodiment vehicle body for an electric vehicle includes a fender apron upper part and an A pillar part positioned at a rear portion of the fender apron upper part, wherein a first load path is formed in a length direction of the vehicle body on an upper part of the fender apron upper part, wherein a second load path is formed in a vertical direction of the vehicle body along a connection portion of the fender apron upper part and the A pillar part, wherein a third load path connecting the first load path and the second load path is obliquely formed in a lower part of the fender apron upper part, and wherein a charging hole is formed between the first, second, and third load paths.

20 Claims, 9 Drawing Sheets

VEHICLE BODY STRUCTURE FOR AN ELECTRIC VEHICLE

CROSS-REFERENCE TO RELATED APPLICATIONS

This application claims the benefit of Korean Patent Application No. 10-2021-0094859, filed on Jul. 20, 2021, which application is hereby incorporated herein by reference.

TECHNICAL FIELD

The present invention relates to a vehicle body structure for an electric vehicle.

BACKGROUND

The charging port of an electric vehicle is located in various positions for each maker, but the most advantageous in terms of convenience is that it is located on the side of the vehicle adjacent to the A pillar, which is the most preferred by users.

However, if the charging port is positioned on the side adjacent to the A pillar, a weak part will occur on the load path of the fender apron corresponding to the load input from the shock tower housing.

For example, in the case of vehicles with a charging port located on the front side of the A pillar, user convenience is increased, but there is a problem in that the cross-section of the upper member of the fender apron is reduced due to penetration of the charging port and wiring.

Reduction of the cross-section of the upper member of the fender apron deteriorates the resistance to the vehicle load input from the shock tower housing, which ultimately leads to the vehicle's road noise and R&H performance being deteriorated.

That is, since the cable penetrates the lower part of the fender apron upper member, the cross-section in the vehicle body height direction is reduced, and the resistance to the input load of the shock tower housing may be reduced.

The above information disclosed in this background section is only for enhancement of understanding of the background of the invention, and therefore it may contain information that does not form the prior art that is already known to a person of ordinary skill in the art.

SUMMARY

The present invention relates to a vehicle body structure for an electric vehicle. Particular embodiments relate to a vehicle body structure for an electric vehicle in which a charging hole is formed.

Embodiments of the present invention provide a vehicle body structure for an electric vehicle that may improve strength against impact load while forming a charging hole.

A vehicle body structure for an electric vehicle in which a charging hole is formed according to an exemplary embodiment of the present invention may include a fender apron upper part and an A pillar part positioned at the rear of the fender apron upper part, wherein a first load path is formed in the length direction of the vehicle body on the upper part of the fender apron upper part, a second load path is formed in a vertical direction of the vehicle body along a connection portion of the fender apron upper part and the A pillar part, a third load path connecting the first load path and the second load path is obliquely formed in the lower part of the fender apron upper part, and the charging hole is formed between the first, second, and third load paths.

The fender apron upper part may include a fender apron upper member, and a front reinforcement connected with the fender apron upper member and of which the charging hole may be formed thereto.

The front reinforcement may include a plurality of first ribs formed in the first direction and a plurality of second ribs formed in the second direction.

The A pillar part may include an upper A pillar and a rear reinforcement coupled to a lower part of the upper A pillar.

The front reinforcement and the rear reinforcement may form a side reinforcement integrally.

The side reinforcement may be formed by casting.

The side reinforcement may include a plurality of first side ribs formed in the first direction and a plurality of second side ribs formed in the second direction.

The side reinforcement may include a front flange connected to a shock absorber housing and a front outer rib protruded in the vehicle width direction.

The side reinforcement may include an outer flange protruded to join a side outer panel.

The vehicle body structure according to an exemplary embodiment of the present invention may further include a rear lower member coupled to the rear reinforcement and a dash panel.

The vehicle body structure according to an exemplary embodiment of the present invention may further include a side sill provided on the outside of the vehicle along the length direction of the vehicle, wherein the rear reinforcement and the rear lower member may be connected with the side sill.

The rear reinforcement may include an outer inclined portion inclined toward the outside of the vehicle and the rear lower member may include an inner inclined portion inclined toward the inside of the vehicle, wherein the outer inclined portion, the inner inclined portion and an upper part of the side sill may form a truss structure.

The fender apron upper member may include an apron inner panel provided inside the vehicle and an apron outer panel provided outside the vehicle, wherein the front of the front reinforcement may include a protruding connection flange formed in a protruding manner to combine with the apron outer panel.

A passing hole may be formed in the apron inner panel at a position corresponding to the protruding connection flange.

The fender apron upper member may further include an upper joint formed in a protruding manner to combine with the upper part of the front reinforcement.

The fender apron upper member may further include an inner panel flange formed to protrude from the apron inner panel to couple with the upper A pillar.

A vehicle body structure for an electric vehicle in which a charging hole is formed according to an exemplary embodiment of the present invention may include a fender apron upper member, an upper A pillar and a side reinforcement including a front reinforcement of which a charging hole is formed and combined with the fender apron upper member to form a fender apron upper part, and a rear reinforcement that combines with the lower part of the upper A pillar to form an A pillar part.

The side reinforcement may include a plurality of first side ribs formed in the first direction and a plurality of second side ribs formed in the second direction.

According to an exemplary embodiment of the vehicle body structure for an electric vehicle, a charging hole is formed near the A pillar to improve user convenience while improving strength against impact load and improving NVH performance.

In addition, the effects obtainable or predicted by the embodiments of the present invention are to be disclosed directly or implicitly in the detailed description of the embodiments of the present invention. That is, various effects predicted according to embodiments of the present invention will be disclosed in the detailed description to be described later.

BRIEF DESCRIPTION OF THE DRAWINGS

Since these drawings are for reference in describing exemplary embodiments of the present invention, the technical spirit of the present invention should not be construed as being limited to the accompanying drawings.

Figure 1:
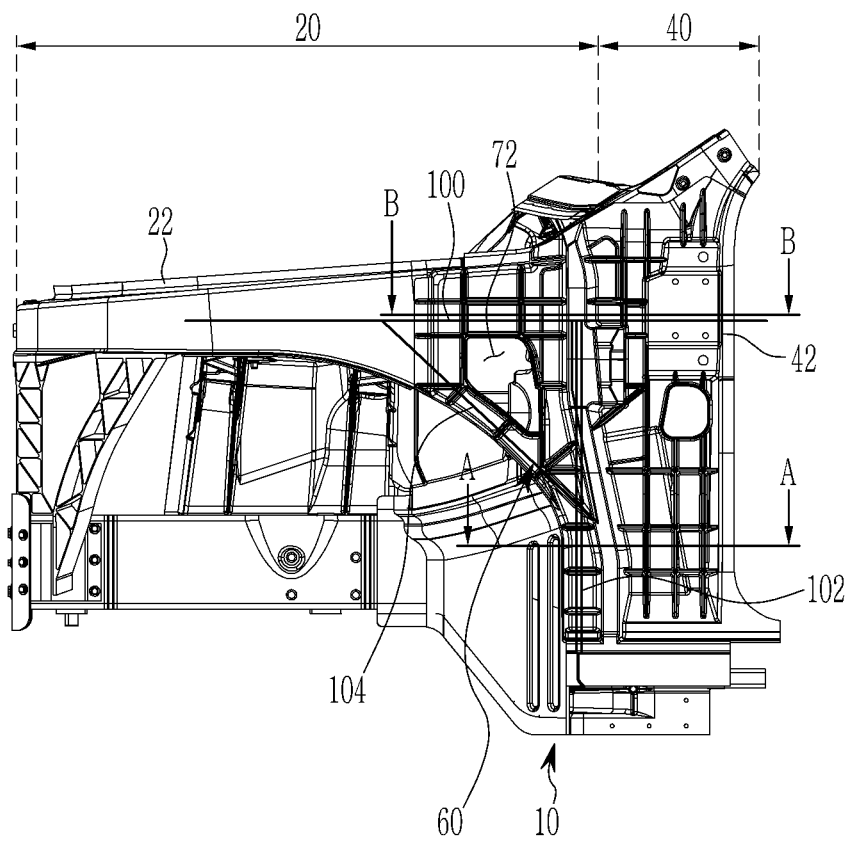
FIG. 1 is a partial side view of a vehicle body structure for an electric vehicle in which a charging hole is formed according to an exemplary embodiment of the present invention.

The following elements may be referenced in combination with the figures to describe embodiments of the present invention.

| | |
|---|---|
| 10: vehicle body | 20: fender apron upper part |
| 22: fender apron upper member | 24: apron inner panel |
| 26: passing hole | 28: apron outer panel |
| 30: upper joint | 32: inner panel flange |
| 33: shock absorber housing | 40: A pillar part |
| 42: upper A pillar | 50: dash panel |
| 52: side sill reinforcement | 54: side outer panel |
| 60: side reinforcement | 61: first side rib |
| 62: second side rib | 64: front flange |
| 65: front outer rib | 66: outer flange |
| 68: reinforcement body | 70: front reinforcement |
| 72: charging hole | 74: first rib |
| 76: second rib | 78: protruding connection flange |
| 80: rear reinforcement | 82: first rib |
| 84: second rib | 86: outer inclined portion |
| 90: rear lower member | 92: side sill |
| 94: inner inclined portion | 100: first load path |
| 102: second load path | 104: third load path |

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain embodiments of the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to that shown in the drawings, and the thickness is enlarged to clearly express various parts and regions.

In addition, in the following detailed description, the reason that the names of components are divided into 1st, 2nd, etc. is to classify them in the same relationship, and it is not necessarily limited to the order in the following description.

Throughout the specification, when a part includes a certain element, it means that other elements may be further included, rather than excluding other elements, unless specifically stated otherwise.

In addition, terms such as "part," and "means" described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Exemplary embodiments of the present invention will hereinafter be described in detail with reference to the accompanying drawings.

FIG. 1 is a partial side view of a vehicle body structure for an electric vehicle in which a charging hole is formed according to an exemplary embodiment of the present invention.

Referring to FIG. 1, a vehicle body structure for an electric vehicle according to an exemplary embodiment of the present invention may include a fender apron upper part 20 forming a part of a vehicle body 10 and an A pillar part 40 positioned at the rear of the fender apron upper part 20.

In the vehicle body structure for an electric vehicle according to an exemplary embodiment of the present invention, a first load path 100 is formed in the length direction of the vehicle body 10 on the upper part of the fender apron upper part 20, a second load path 102 is formed in the vertical direction of the vehicle body 10 along a connection portion of the fender apron upper part 20 and the A pillar part 40, and a third load path 104 connecting the first load path 100 and the second load path 102 may be obliquely formed in the lower part of the fender apron upper part 20. In addition, a charging hole 72 may be formed between the first, second, and third load paths 100, 102, and 104.

That is, in the vehicle body structure for an electric vehicle according to an exemplary embodiment of the present invention, the first, second, and third load paths 100, 102, 104 form a kind of trussed structure to enhance rigidity, and even if there is an input load transmitted from the shock tower housing, the charging hole 72 is formed between the truss structures to maintain vehicle rigidity, thereby improving performance against road noise and R&H.

Figure 2:
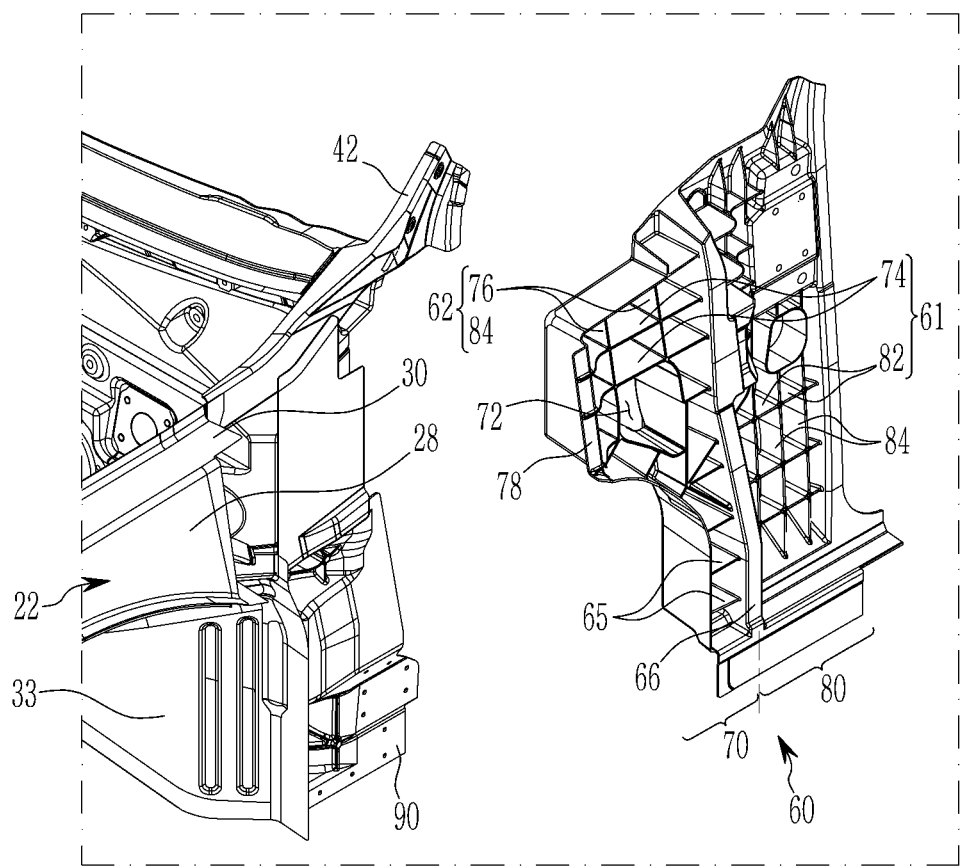
FIG. 2 is a partially exploded perspective view of a vehicle body structure for an electric vehicle in which a charging hole is formed according to an exemplary embodiment of the present invention.

FIG. 2 is a partially exploded perspective view of a vehicle body structure for an electric vehicle in which a charging hole is formed according to an exemplary embodiment of the present invention.

Referring to FIG. 1 and FIG. 2, the fender apron upper part 20 may include a fender apron upper member 22 and a front reinforcement 70 connected with the fender apron upper member 22 and of which the charging hole 72 is formed thereto.

The front reinforcement 70 may include a plurality of first ribs 74 formed in the first direction, for example, the length direction of the vehicle body 10, and a plurality of second ribs 76 formed in the second direction, for example, the height direction of the vehicle body 10.

The A pillar part 40 may include an upper A pillar 42 and a rear reinforcement 80 coupled to a lower part of the upper A pillar 42.

The rear reinforcement 80 may include a plurality of first ribs 82 formed in the first direction, for example, the length direction of the vehicle body 10, and a plurality of second ribs 84 formed in the second direction, for example, the height direction of the vehicle body 10.

The front reinforcement 70 and the rear reinforcement 80 may form a side reinforcement 60 integrally.

That is, the vehicle body structure for an electric vehicle according to an exemplary embodiment of the present invention may include the fender apron upper member 22, the upper A pillar 42, and the side reinforcement 60 including the front reinforcement 70 of which the charging hole 72 is formed and combined with the fender apron upper member 22 to form the fender apron upper part 20, and the rear reinforcement 80 that combines with the lower part of the upper A pillar 42 to form the A pillar part 40.

The side reinforcement 60 may be formed by casting. The side reinforcement 60 is integrally formed by casting, and by forming a part of the fender apron upper part 20 and the A pillar part 40, the connection strength may be enhanced.

The side reinforcement 60 may include a plurality of first side ribs 61 formed in the first direction and a plurality of second side ribs 62 formed in the second direction.

That is, the first side ribs 61 may include, for example, the first rib 74 of the front reinforcement 70 and the first rib 82 of the rear reinforcement 80 formed in the length direction of the vehicle body 10.

In addition, the second side ribs 62 may include, for example, the second rib 76 of the front reinforcement 70 and the second rib 84 of the rear reinforcement 80 formed in the height direction of the vehicle body 10.

Figure 3:
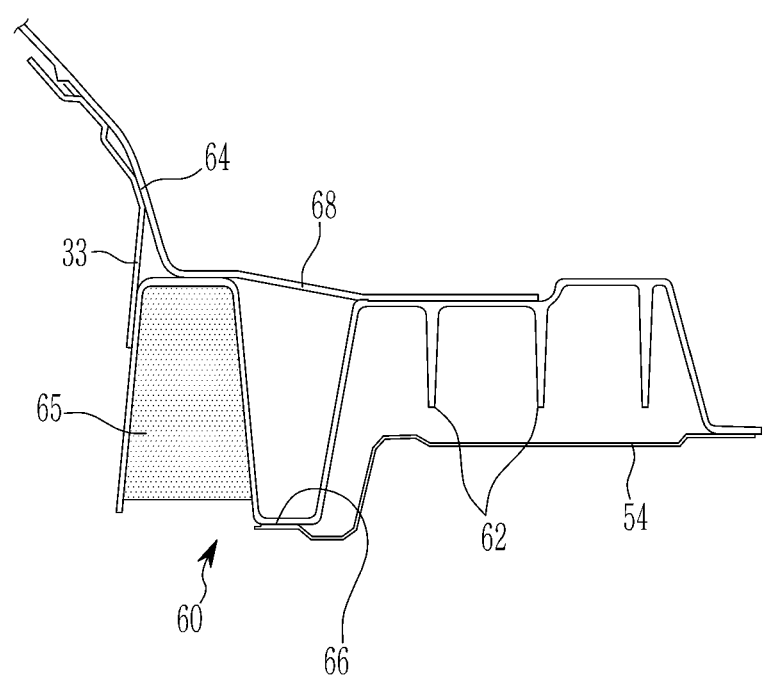
FIG. 3 is a cross-sectional view along line A-A in FIG. 1.

FIG. 3 is a cross-sectional view along line A-A in FIG. 1.

Referring to FIG. 1 to FIG. 3, the side reinforcement 60 may include a front flange 64 connected to a shock absorber housing 33 and a front outer rib 65 protruded in the vehicle width direction.

The front flange 64 is connected to the shock absorber housing 33 to receive the vibration and impact load transmitted from the shock absorber housing 33 and transmit it to the rear of vehicle. And the front outer rib 65 is formed on the path of the second load path 102, strengthening the connectivity of the fender apron upper part 20 and the A pillar part 40, and distributing the impact load.

The side reinforcement 60 includes a reinforcement body 68, and the front flange 64, the front outer rib 65, the first side rib 61, and the second side rib 62 extend or protrude from the reinforcement body 68 to secure rigidity of the side reinforcement 60.

The side reinforcement 60 may include an outer flange 66 formed in a protruding manner to join a side outer panel 54. That is, the side outer panel 54 forming the exterior of the vehicle body 10 may be bonded to the outer flange 66 by welding.

Figure 4:
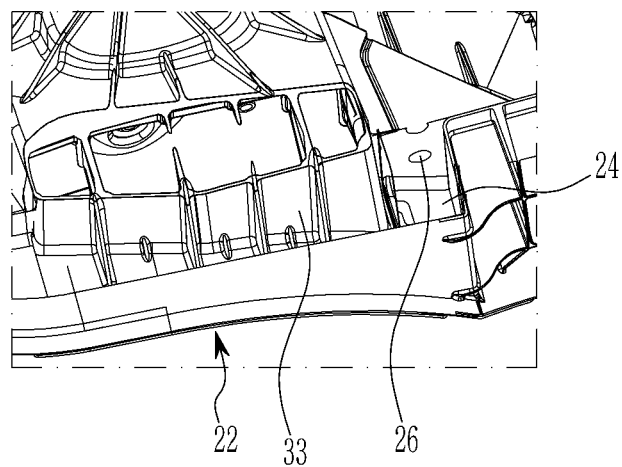
FIG. 4 is a cross-sectional perspective view along line B-B in FIG. 1.
Figure 5:
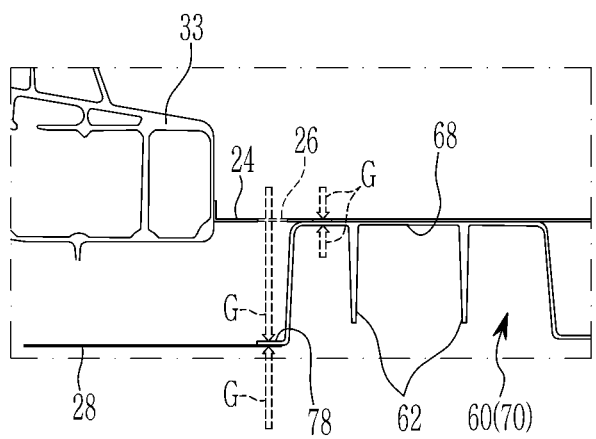
FIG. 5 is a cross-sectional view along line B-B in FIG. 1.
Figure 6:
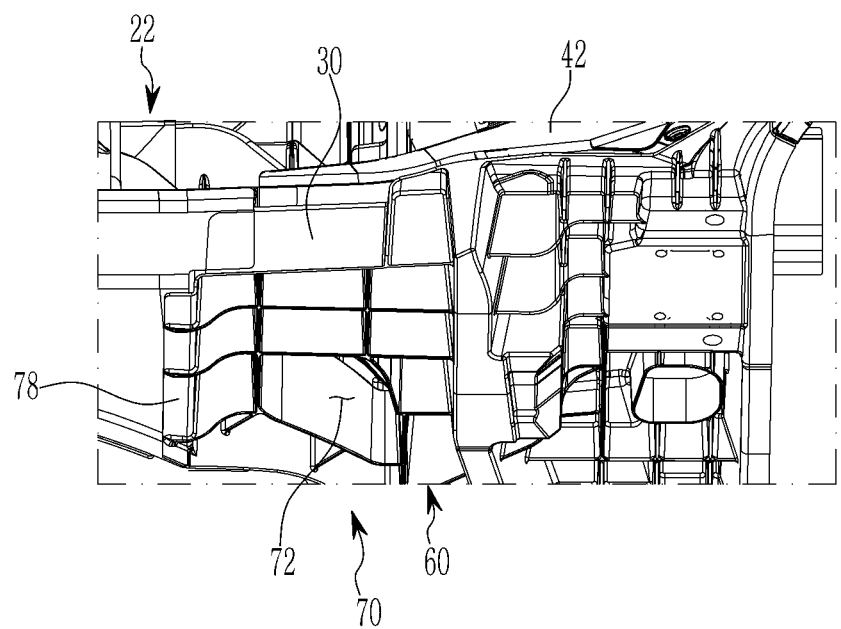
FIG. 6 is a partial perspective view of a vehicle body structure for an electric vehicle in which a charging hole is formed according to an exemplary embodiment of the present invention.

FIG. 4 is a cross-sectional perspective view along line B-B of FIG. 1, FIG. 5 is a cross-sectional view along line B-B in FIG. 1, and FIG. 6 is a partial perspective view of a vehicle body structure for an electric vehicle in which a charging hole is formed according to an exemplary embodiment of the present invention.

Referring to FIG. 4 to FIG. 6, the fender apron upper member 22 includes an apron inner panel 24 provided inside the vehicle and an apron outer panel 28 provided outside the vehicle. And, the front of the front reinforcement 70 may include a protruding connection flange 78 formed in a protruding manner to combine with the apron outer panel 28. The protruding connection flange 78 and the apron outer panel 28 may be joined by welding.

A passing hole 26 may be formed in the apron inner panel 24 at a position corresponding to the protruding connection flange 78.

Using a welding gun G, the apron inner panel 24 and the reinforcement body 68 may be joined by welding, and the protruding connection flange 78 and the apron outer panel 28 may be welded with the welding gun G through the passing hole 26. That is, the fender apron upper member 22 and the front reinforcement 70 are double-bonded on the cross-section so that the connection strength may be further increased.

The fender apron upper member 22 may further include an upper joint 30 formed in a protruding manner to combine with the upper part of the front reinforcement 70, so that the bonding strength may be further increased. The front reinforcement 70 and the upper joint 30 may be joined by welding.

Figure 7:
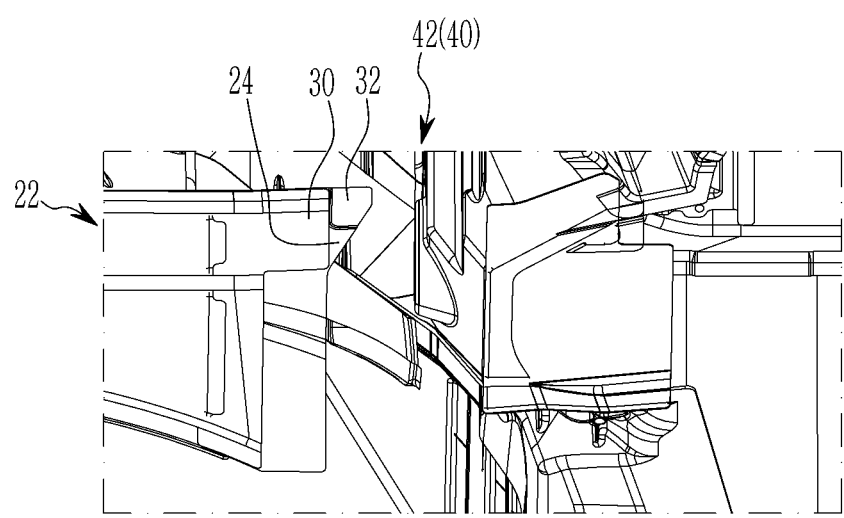
FIG. 7 is a partial perspective view of a vehicle body structure for an electric vehicle in which a charging hole is formed according to an exemplary embodiment of the present invention in which a side reinforcement part is excluded.

FIG. 7 is a partial perspective view of a vehicle body structure for an electric vehicle in which a charging hole is formed according to an exemplary embodiment of the present invention in which a side reinforcement part is excluded.

Referring to FIG. 2, FIG. 6 and FIG. 7, the fender apron upper member 22 may further include an inner panel flange 32 formed to protrude from the apron inner panel 24 to couple with the upper A pillar 42. The inner panel flange 32 and the upper A pillar part 40 may be joined by welding.

Figure 8:
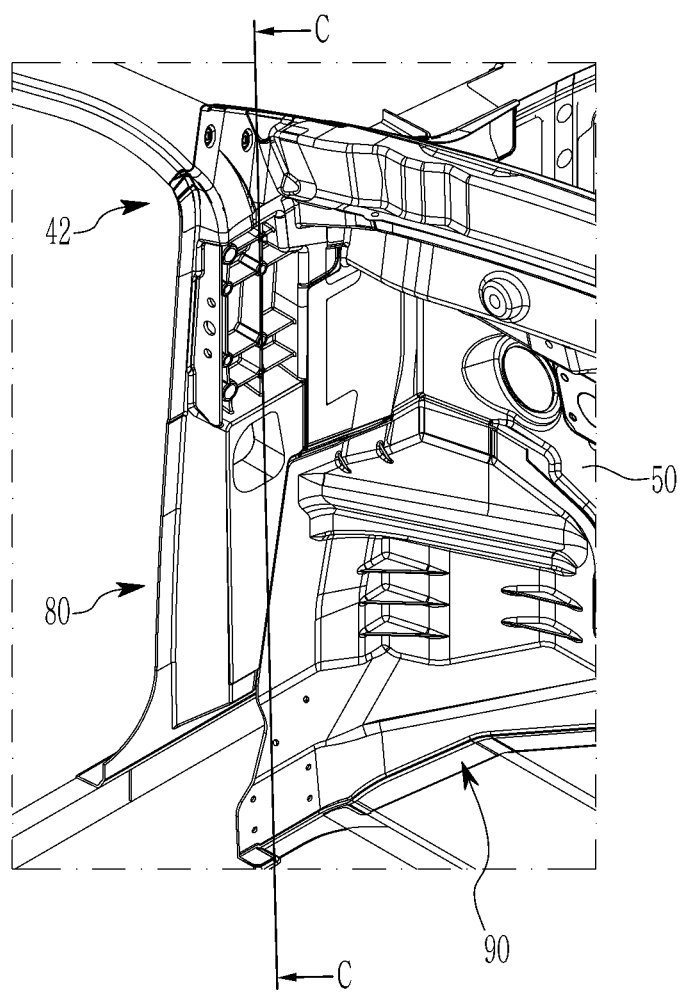
FIG. 8 is a partial perspective view seen from the inside of the vehicle body structure for an electric vehicle in which a charging hole is formed according to an exemplary embodiment of the present invention.
Figure 9:
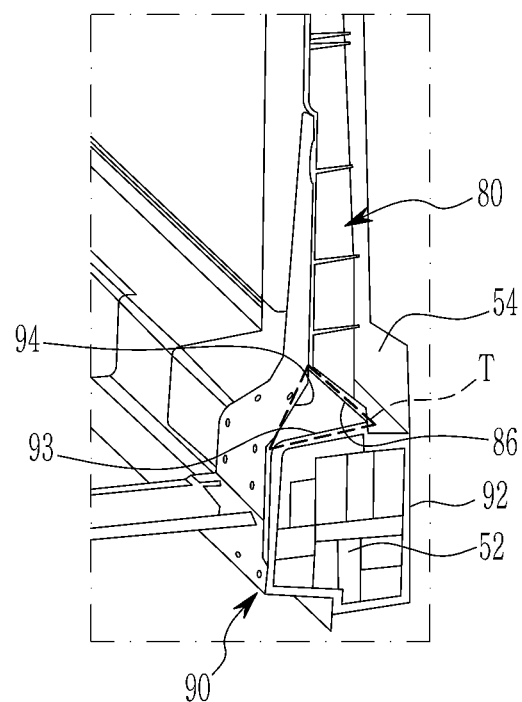
FIG. 9 is a partial cross-sectional view along line C-C in FIG. 8.

FIG. 8 is a partial perspective view seen from the inside of the vehicle body structure for an electric vehicle in which a charging hole is formed according to an exemplary embodiment of the present invention, and FIG. 9 is a partial cross-sectional view along line C-C of FIG. 8.

Referring to FIG. 8 and FIG. 9, the vehicle body structure for an electric vehicle according to an exemplary embodiment of the present invention may further include a rear lower member 90 coupled to the rear reinforcement 80 and a dash panel 50.

The vehicle body structure for an electric vehicle according to an exemplary embodiment of the present invention may further include a side sill 92 provided on the outside of the vehicle along the length direction of the vehicle.

The rear reinforcement 80 and the rear lower member 90 may be connected with the side sill 92 to increase the strength of the vehicle body side. The side sill reinforcement 52 is inserted in the side sill 92 to protect the battery (not shown) disposed in the lower part of the vehicle body 10.

The rear reinforcement 80 may include an outer inclined portion 86 inclined toward the outside of the vehicle, and the rear lower member 90 may include an inner inclined portion 94 inclined toward the inside of the vehicle.

The outer inclined portion 86, the inner inclined portion 94 and an upper part 93 of the side sill 92 form a kind of truss structure T to improve connection strength and distribute the impact load. That is, the outer inclined portion 86, the inner inclined portion 94 and the upper part 93 of the side sill 92 are combined in an approximately triangle cross-section shape, which improves the bonding strength of the front vehicle body, the A pillar part 40 and the side sill 92, and makes it possible to distribute the impact load.

According to an exemplary embodiment of the vehicle body structure for an electric vehicle according to embodiments of the present invention, a charging hole is formed near the A pillar to improve user convenience while improving strength against impact load and improving NVH performance.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vehicle body for an electric vehicle, the vehicle body comprising:
    a fender apron upper part; and
    an A-pillar part positioned at a rear portion of the fender apron upper part;
    wherein a first load path is formed in a length direction of the vehicle body on an upper part of the fender apron upper part;
    wherein a second load path is formed in a vertical direction of the vehicle body along a connection portion of the fender apron upper part and the A-pillar part;
    wherein a third load path connecting the first load path and the second load path is obliquely formed in a lower part of the fender apron upper part; and
    wherein:
        a charging hole is formed between the first, second, and third load paths, and
        the first, second, and third load paths are located above a rear lower member.
2. The vehicle body of claim 1, wherein the fender apron upper part comprises:
    a fender apron upper member; and
    a front reinforcement connected with the fender apron upper member, the charging hole being formed in the front reinforcement.
3. The vehicle body of claim 2, wherein the front reinforcement comprises:
    a plurality of first ribs formed in the length direction of the vehicle body; and
    a plurality of second ribs formed in a height direction of the vehicle body.
4. The vehicle body of claim 2, wherein the A-pillar part comprises:
    an upper A-pillar; and
    a rear reinforcement coupled to a lower part of the upper A-pillar.
5. The vehicle body of claim 4, wherein the front reinforcement and the rear reinforcement integrally form a side reinforcement.
6. The vehicle body of claim 5, wherein the side reinforcement is formed by casting.
7. The vehicle body of claim 5, wherein the side reinforcement comprises:
    a plurality of first side ribs formed in a length direction of the vehicle body; and
    a plurality of second side ribs formed in a height direction of the vehicle body.
8. The vehicle body of claim 5, wherein the side reinforcement comprises:
    a front flange connected to a shock absorber housing; and
    a front outer rib protruded in a vehicle width direction.
9. The vehicle body of claim 5, wherein the side reinforcement comprises a protruding outer flange formed to join a side outer panel.
10. The vehicle body of claim 4, further comprising the rear lower member coupled to the rear reinforcement and a dash panel.
11. The vehicle body of claim 10, further comprising a side sill provided on an outside of the vehicle body along the length direction of the vehicle body, wherein the side sill connects the rear reinforcement and the rear lower member.
12. The vehicle body of claim 11, wherein:
    the rear reinforcement comprises an outer inclined portion inclined toward the outside of the vehicle body;
    the rear lower member comprises an inner inclined portion inclined toward an inside of the vehicle body; and
    the outer inclined portion, the inner inclined portion and an upper part of the side sill define a truss structure.
13. A vehicle body for an electric vehicle, the vehicle body comprising:
    a fender apron upper part comprising:
        a fender apron upper member comprising an apron inner panel provided inside the vehicle body and an apron outer panel provided outside the vehicle body; and
        a front reinforcement connected with the fender apron upper member, a charging hole being formed in the front reinforcement, wherein the front reinforcement comprises a plurality of first ribs formed in a length direction of the vehicle body, a plurality of second ribs formed in a height direction of the vehicle body, and a protruding connection flange at a front of the front reinforcement, the protruding connection flange attached to the apron outer panel; and
    an A-pillar part positioned at a rear portion of the fender apron upper part;
    wherein a first load path is formed in the length direction of the vehicle body on an upper part of the fender apron upper part;
    wherein a second load path is formed in a vertical direction of the vehicle body along a connection portion of the fender apron upper part and the A-pillar part;
    wherein a third load path connecting the first load path and the second load path is obliquely formed in a lower part of the fender apron upper part; and
    wherein:
        the charging hole is formed between the first, second, and third load paths, and
        the first, second, and third load paths are located above a rear lower member.
14. The vehicle body of claim 13, further comprising a passing hole in the apron inner panel at a position corresponding to the protruding connection flange.

15. The vehicle body of claim 13, wherein the fender apron upper member further comprises a protruding upper joint attached to the upper part of the front reinforcement.

16. The vehicle body of claim 13, wherein the A-pillar part comprises:
an upper A-pillar; and
a rear reinforcement coupled to a lower part of the upper A-pillar.

17. The vehicle body of claim 16, wherein the fender apron upper member further comprises an inner panel flange formed to protrude from the apron inner panel to couple with the upper A-pillar.

18. The vehicle body of claim 16, wherein the front reinforcement and the rear reinforcement integrally form a side reinforcement.

19. A vehicle body for an electric vehicle, the vehicle body comprising:
a fender apron upper member;
an upper A-pillar; and
a side reinforcement comprising:
a front reinforcement attached to the fender apron upper member to form a fender apron upper part, a charging hole being formed in the front reinforcement;
a rear reinforcement combined with a lower part of the upper A-pillar to form an A-pillar part;
a plurality of first side ribs formed in a length direction of the vehicle body; and
a plurality of second side ribs formed in a height direction of the vehicle body;
wherein a first load path is formed in a length direction of the vehicle body on an upper part of the fender apron upper part;
wherein a second load path is formed in a vertical direction of the vehicle body along a connection portion of the fender apron upper part and the A-pillar part;
wherein a third load path connecting the first load path and the second load path is obliquely formed in a lower part of the fender apron upper part; and
wherein:
the charging hole is formed between the first, second, and third load paths, and
the first, second, and third load paths are located above a rear lower member.

20. The vehicle body of claim 19, wherein the rear lower member is coupled to the rear reinforcement and a dash panel.

* * * * *